United States Patent [19]
Jensen et al.

[11] Patent Number: 5,555,195
[45] Date of Patent: Sep. 10, 1996

[54] CONTROLLER FOR USE IN AN ENVIRONMENT CONTROL NETWORK CAPABLE OF STORING DIAGNOSTIC INFORMATION

[75] Inventors: Howard A. Jensen, Mequon; John E. Seem, Menomonee Falls, both of Wis.

[73] Assignee: Johnson Service Company, Milwaukee, Wis.

[21] Appl. No.: 278,915

[22] Filed: Jul. 22, 1994

[51] Int. Cl.$^6$ ........................................... G01F 1/06
[52] U.S. Cl. .................. 364/551.01; 364/510; 62/93; 62/126; 236/49.3; 165/100; 165/217
[58] Field of Search ........................................... 364/550, 510, 364/551.01; 62/93, 126, 129; 236/49.3, 45, 25 R; 165/16, 2, 100

[56] References Cited

U.S. PATENT DOCUMENTS

| | | | |
|---|---|---|---|
| 4,630,670 | 12/1986 | Wellman et al. | 165/16 |
| 5,058,388 | 10/1991 | Shaw et al. | 62/93 |
| 5,071,065 | 12/1991 | Aalto et al. | 236/49.3 |
| 5,311,451 | 5/1994 | Barrett | 364/550 |
| 5,446,677 | 8/1995 | Jensen et al. | 364/510 |

*Primary Examiner*—Emanuel T. Voeltz
*Assistant Examiner*—Kamini Shah
*Attorney, Agent, or Firm*—Harness, Dickey & Pierce, P.L.C.

[57] ABSTRACT

The present invention relates to a diagnostic system for use in a network control system. The diagnostic system is preferably utilized to analyze VAV box performance in an environmental control system such as a network facilities management system. The diagnostic system advantageously records temperature, airflow, and actuator position data in the controller associated with the VAV box. Such a system allows person to analyze VAV boxes and controller performance over a particular timely period and the lifetime of the system. Box and damper warnings may be provided by the diagnostic system when the box or damper is operating below particular performance levels. Preferably, the diagnostic system formats the air flow actuator positions and temperature data so that it can be displayed for graphing. The diagnostic data is advantageously stored in the individual controllers.

2 Claims, 8 Drawing Sheets

_Fig-1_

_Fig-2_

```
/*
/* DAMPER DIAGNOSTICS
/*
/*
SYMBOL VAV_1_INDEPENDENT_DIAG_DUTYCYCLE [] = {
        "ADD TYPE              ",   MODULE,  DON'T_CARE,
        "FLOAT 1.5             ",   FCONST,       1.50,
        "CONTROLLER RUN TIME   ",   FLOAT,     RESULT,
        "CONTROLLER RUN TIME   ",   FLOAT,     RESULT,      /* SECONDS */

"OR TYPE               ",   MODULE,  DON'T_CARE,
        "DAMPER OPEN           ",   BINARY,    OUTPUT,
        "DAMPER CLOSE          ",   BINARY,    OUTPUT,
        "ON                    ",   BINARY,    RESULT,

"MUX TYPE              ",   MODULE,  DON'T_CARE,
        "FLOAT 1.5             ",   FCONST,       1.50,
        "ZERO                  ",   FCONST,       0.00,
        "ON                    ",   BINARY,    RESULT,
        "TICKS                 ",   FLOAT,     RESULT,

"ADD TYPE              ",   MODULE,  DON'T_CARE,
        "TICKS                 ",   FLOAT,     RESULT,
        "ACTUATOR RUN TIME     ",   FLOAT,     RESULT
        "ACTUATOR RUN TIME     ",   FLOAT,     RESULT
        };

SYMBOL VAV_1_INDEPENDENT_DIAG_OCC_RUNTIME [] = {

/* ADD UP OCC RUN TIME
        "IF SKIP TYPE          ",   MODULE,  DON'T_CARE,    /* NOT (OCC. OR STANDBY)
        "BYTE W04              ",   BINARY,    RESULT,

"ADD TYPE              ",   MODULE   DON'T_CARE,
        "ONE                   ",   FCONST,       1.0,
        "OCC RUN TIME          ",   FLOAT,     RESULT,
        "OCC RUN TIME          ",   FLOAT,     RESULT        /* TICKS */
        };

SYMBOL VAV_1_INDEPENDENT_DIAG_TEMPER [] = {

"MUX TYPE              ",   MODULE,  DON'T_CARE,
        "ACTUAL HTG SETPT      ",   FLOAT,     RESULT,     /* HEATING SETPOINT */
        "ACTUAL CLG SETPT      ",   FLOAT,     RESULT,     /* COOLING SETPOINT */
        "HEAT MODE             ",   BINARY,    RESULT,     /*INTO HEATING SIDE
        "SETPT                 ",   FLOAT,     RESULT,

"SUBTRACT TYPE         ",   MODULE   DON'T_CARE
        "FSOFT ZONE TEMP       ",   FLOAT,     RESULT,
        "SETPT                 ",   FLOAT,     RESULT,
```

Fig-13A

```
            "DIFF1                         ",    FLOAT,     RESULT,

"ABS VALUE TYPE                ",    MODULE,    DON'T_CARE,
            "DIFF1                         ",    FLOAT,     RESULT,
            "ABS_TDIFF                     ",    FLOAT,     RESULT,

/* ADD UP TEMP OFFSET
            "IF SKIP TYPE                  ",    MODULE,    DON'T_CARE,
            "BYTE W04                      ",    BINARY,    RESULT,         /*NOT(OCC..OR.STANDBY)

"ADD TYPE                      ",    MODULE,    DON'T_CARE,
            "ABS_TDIFF                     ",    FLOAT,     RESULT,
            "TOTAL TMP DIFF                ",    FLOAT,     RESULT,
            "TOTAL TMP OFF                 ",    FLOAT,     RESULT,

/* CALC AVERAGE TEMP DIFF
            "DIVIDE TYPE                   ",    MODULE,    DON'T_CARE,
            "TOTAL TMP DIFF                ",    FLOAT,     RESULT,
            "OCC RUN TIME                  ",    FLOAT,     RESULT,         /* TICKS*/
            "AVERAGE TEMP ERROR            ",    FLOAT,     RESULT
            };

SYMBOL VAV_1_INDEPENDENT_DIAG_CFMERR[ ] = {

"SUBTRACT TYPE                 ",    MODULE,    DON'T_CARE
            "SUPPLY FLOW                   ",    FLOAT,     RESULT,         /* INPUT
            "SUPPLY SETPT                  ",    FLOAT,     PARAM,          /* SETPOINT
            "DIFF2                         ",    FLOAT,     RESULT,

"ABS VALUE TYPE                ",    MODULE,    DON'T_CARE,
            "DIFF2                         ",    FLOAT,     RESULT,
            "ABS_FDIFF                     ",    FLOAT,     RESULT,

/* ADD UP CFM OFFSET
            "IF SKIP TYPE                  ",    MODULE,    DON'T_CARE,
            "BYTE W04                      ",    BINARY,    RESULT,         /* NOT (OCC OR STANDBY)

"ADD TYPE                      ",    MODULE,    DON'T_CARE
            "ABS_FDIFF                     ",    FLOAT,     RESULT,
            "TOTAL CFM DIFF                ",    FLOAT,     RESULT,
            "TOTAL CFM DIFF                ",    FLOAT,     RESULT,

/* CALC AVERAGE CFM OFFSET
            "DIVIDE TYPE                   ",    MODULE,    DON'T_CARE,
            "TOTAL CFM DIFF                ",    FLOAT,     RESULT,
            "OCC RUN TIME                  ",    FLOAT,     RESULT,         /*TICKS*/
            "AVERAGE FLOW ERROR            ",    FLOAT,     RESULT
            };
/*
```

Fig-13B

CONTROLLER FOR USE IN AN ENVIRONMENT CONTROL NETWORK CAPABLE OF STORING DIAGNOSTIC INFORMATION

CROSS REFERENCE TO RELATED APPLICATIONS

The present application is related to U.S. Ser. No. 08/234, 827, filed Apr. 27, 1994, now U.S. Pat. No. 5,446,677 entitled "Diagnostic System for Use in an Environment Control Network," assigned to the assignee of the present application.

NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

CROSS REFERENCE TO APPENDIX A

Appendix A is attached hereto and includes a pseudo code listing in accordance with an exemplary embodiment of the present invention.

BACKGROUND OF THE INVENTION

The present invention is related to an environmental control system. More particularly, the present invention is related to a controller which stores diagnostic information related to the control of an environment or the operation of damper systems utilized in an environment control network.

Environment control networks or facility management systems are employed in office buildings, manufacturing facilities, and the like, for controlling the internal environment of the facility. The environment control network may be employed to control temperature, airflow, humidity, lighting, or security in the internal environment.

In environment control networks, controlled air units (variable air volume (VAV) boxes or unitary devices (UNT)) are located throughout the facility and provide environmentally controlled air to the internal environment. The controlled air is provided at a particular temperature or humidity so that a comfortable internal environment is established. The air flow rate of the controlled air is preferably measured in cubic feet per minute (CFM).

The VAV boxes are coupled to an air source which supplies the controlled air to the VAV box via duct work. VAV boxes and unitary devices provide the controlled air through a damper. The damper regulates the amount of the controlled air provided to the internal environment. The damper is coupled to an actuator which preferably positions the damper so that appropriate air flow (in CFM) is provided to the internal environment.

A controller is generally associated with at least one actuator and damper. The controller receives information related to the air flow and temperature in the internal environment and appropriately positions the actuator so that the appropriate air flow is provided to the internal environment. The controller may include sophisticated feedback mechanisms such as proportional integral (PI) control algorithms. Sophisticated feedback mechanisms allow the actuator to be positioned more precisely.

The controller may be coupled to a communication bus within the environment control network and is able to communicate with other components within the environment control network. For example, the controller may include circuitry which indicates when the controller has experienced a catastrophic malfunction. A message indicative of this malfunction may be communicated to components within the network across the communication bus. Also, the controllers may receive hazardous warning messages on the communication bus, such as a fire warning. The controller may be configured to close all dampers in response to a fire warning. Thus, the controllers are generally capable of receiving and transmitting information and messages from other components within the environment control network.

Large buildings typically have hundreds of controlled air units (VAV boxes and unitary devices) which are positioned in hard to reach and visually obstructed places. Service people in charge of repairing controllers and associated actuators receive complaints of a most general nature about the internal environment and are required to find the controlled air units which are responsible for the complaints. Once the hidden units are found, the service people must uncover the units and manually perform diagnostics for the units and the associated controllers by manipulating controls on the units and controllers.

Although service people are able to periodically perform diagnostic tests as described above, they are completely unaware of the ordinary operation of the controller and controlled air unit. For example, the service people have no information about the duty cycle of the actuator, the temperature error in the environment, airflow error, or controller run time when the service people are away. Conventional environmental networks have not included a diagnostic system for automatically and periodically recording summary data indicative actuator positions, temperature error, and airflow rate error over time. Thus, there is a need for a controller configured to store data associated with the lifetime operation of the controlled air unit and associated controller.

SUMMARY OF THE INVENTION

The present invention relates to a controller operatively associated with a unit which provides forced air to an environment. The unit includes an actuator which controls an amount of the forced air provided to the environment. The controller includes an actuator output, a communication port, a memory, and a processor. The actuator output is coupled with the actuator and provides an actuator signal for controlling the position of the actuator. The processor is configured to calculate and store average data related to the actuator signal.

The present invention also relates to an environment control system including a work station and a plurality of units. Each of the units provides forced air to an environment and is associated with a controller. Each controller is coupled to the work station via a communication bus and includes an environment sensor, a memory, and a processor. The environment sensor provides a parameter value related to the environment. The parameter value is provided over time. The processor is coupled with memory and the environment sensor. The processor is configured to cyclically receive the parameter value and provide a summary value related to the parameter value and store the summary value in the memory. The processor is able to provide the summary value to the communication bus.

The present invention also relates to a VAV controller operatively associated with a VAV box and coupled with a first communication bus. The VAV controller includes a parameter input means, a communication port, a memory means and a processor means. The parameter input means receives a parameter value, and the memory means stores diagnostic information. The communication port is coupled with the first communication bus. The processor means is coupled with a memory means, the parameter means,, and communication port. The processor means receives the parameter value at the parameter input and generates the diagnostic information. The diagnostic information is related to an error associated with the parameter value. The processor means is also configured to provide the diagnostic information to the communication port.

Certain aspects of the present invention advantageously provide summary data (diagnostic information) indicative of the lifetime operation of the actuator and controller. Such summary data can include temperature error data, airflow error data, controller ON time data, and actuator duty cycle data. The summary data can be utilized by the operator to review lifetime controller performance from a remote location.

The controller of the present invention advantageously stores the summary data in its own memory, thereby relieving the network and work station of the memory and communication burden associated with the diagnostic information. In another aspect of the invention, a workstation or portable computer coupled with the controller receives the data and stores the data on a mass storage media such as a hard disk drive. The workstation or portable computer displays the data in graph form or spreadsheet form so that controller performance of the entire network can be easily analyzed.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENT OF THE PRESENT INVENTION

Figure 1:
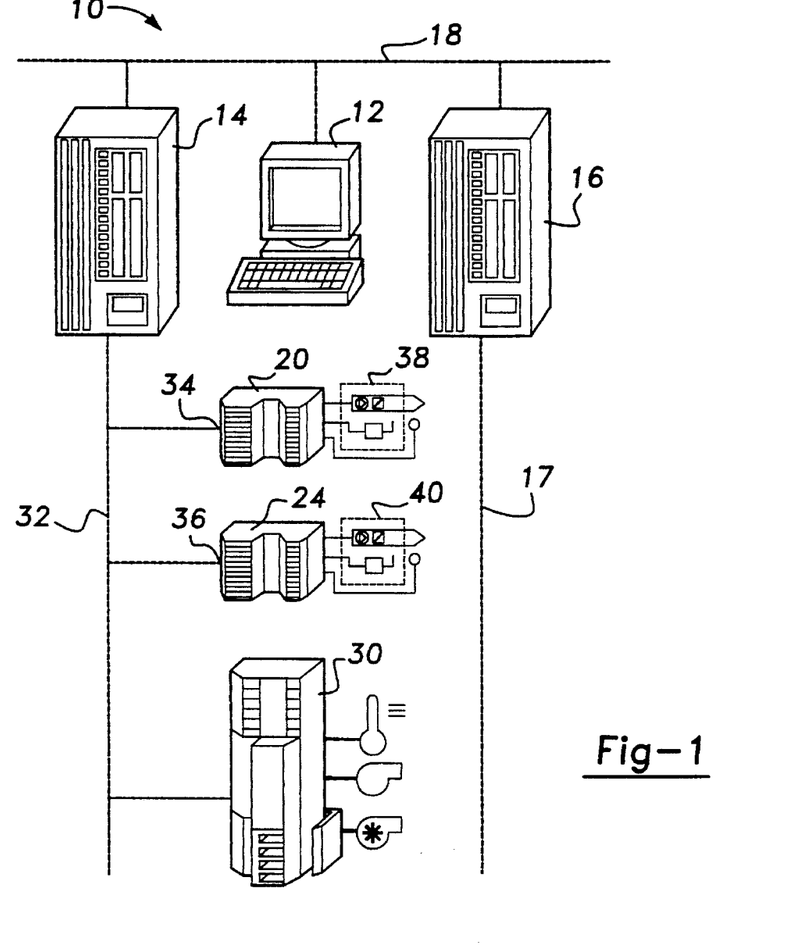
FIG. 1 is a simplified schematic block diagram of an environment control system.

Referring to FIG. 1, an environment control system 10 includes a work station 12, a station 14, a station 16, a controller 20, a controller 24, and a controller or module 30. Controllers 20, 24 and module 30 are coupled with station 14 via a communication bus 32. Work station 12, station 14 and station 16 are coupled together via a communication bus 18. Station 16 is also coupled to a communication bus 17. Communication bus 17 may be coupled to additional sections or additional controllers, as well as other components utilized in environment control system 10.

Preferably, environment control system 10 is a facilities management system such as the Metasys™ system as manufactured by Johnson Controls, Inc. (JCI) for use with VAV boxes 38 and 40. Alternatively, system 10 can be a unitary system having roof-top units or other damper systems. Stations 14 and 16 are preferably an NCU station manufactured by JCI, and controllers 20 and 24 are VAV 100-0™ controllers manufactured by JCI. Controller or module 30 is preferably an air handler control unit (AHU) such as a AHU 102-0™ unit manufactured by JCI for monitoring and effecting the operation of an air handler (not shown) which provides forced air for system 10.

Communication buses 17 and 32 are N2 buses preferably comprised of a twisted pair of conductors, and communication bus 18 is a LAN (N1) bus for high level communications preferably comprised of a twisted pair of conductors. Bus 18 is a high speed bus using ARCNET™ protocol. Work station 12 and stations 14 and 16 include ARCNET communication hardware. Buses 17 and 32 utilize RS485 protocol. Controllers 20 and 24, module 30, and stations 14 and 16 include RS485 communication hardware. Preferably, controllers 20 and 24, stations 14 and 16, and work station 12 include communication software for transmitting and receiving data and messages on buses 17, 18 and 32.

Controller 20 is operatively associated with a controlled air unit such as VAV box 38, and controller 24 is operatively associated with a controlled air unit such as VAV box 40. Controller 20 communicates with work station 12 via communication bus 32 through station 14 and communication bus 18. Preferably, station 14 multiplexes data over communication bus 32 to communication bus 18. Station 14 operates to receive data on communication bus 32, provide data to communication bus 18, receive data on communication bus 18, and provide data to communication bus 32. Station 14 preferably is capable of other functions useful in environment control system 10. Work station 12 is preferably a PC/AT computer or may be a portable computer which is coupled to communication bus 18.

Figure 2:
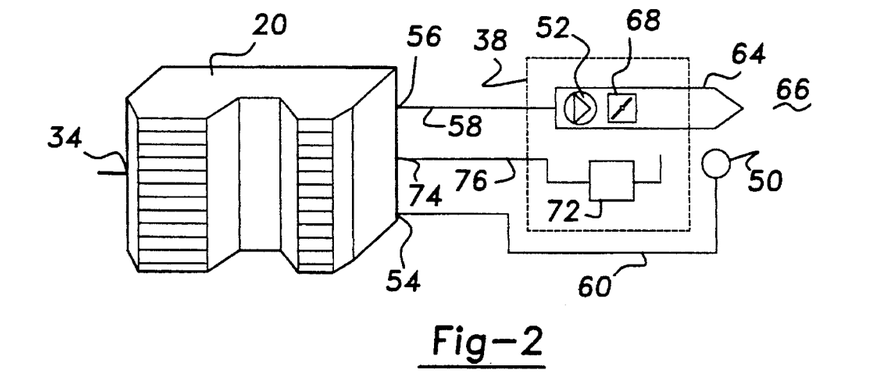
FIG. 2 is a more detailed schematic block diagram of a controller and a VAV box for use in the environment control system illustrated in FIG. 1.

The following is a more detailed description of controller 20 and VAV box 38 with reference to FIG. 2. Controller 20 is preferably a direct digital control (DDC) which includes a communication port 34 coupled with communication bus 32 (FIG. 1). Controller 20 preferably includes an air flow input 56, a temperature input 54, and an actuator output 74. VAV box 38 may also advantageously include heating or cooling units for treating an air flow 64. Inputs 54 and 56 are preferably analog inputs received by an A/D converter (not shown) in controller 20. Controller 20 preferably includes circuitry and software for conditioning and interpreting the signals on inputs 54 and 56.

VAV control box 38 preferably includes a damper 68, an air flow sensor 52, and an actuator 72. Actuator 72 positions damper 68 and is preferably an electric motor based actuator. Alternatively, actuator 72 and controller 20 may be pneumatic or any other type of device for controlling and positioning damper 68. Actuator 72 is preferably an EDA-2040™ motor manufactured by JCI having a full stroke time ($T_{stroke}$) of 1, 2, or 5.5 minutes for a 90° stroke.

The position of damper 68 controls the amount of air flow 64 provided to environment 66. Environment 66 is preferably a room, hallway, building, or portion thereof or other internal environment. Air flow sensor 52 preferably provides a parameter such as an air flow parameter across conductor 58 to air flow input 56. The airflow parameter represents the amount of air flow 64 provided through damper 68 to an environment 66.

Controller 20 provides an actuator output signal to actuator 72 from actuator output 74 via a conductor 76. Controller 20 receives a temperature signal from a temperature sensor 50 across a conductor 60 at temperature input 54. Temperature sensor 50 is generally a resistive sensor located in environment 66.

Air flow sensor 52 is preferably a differential pressure ($\Delta P$) sensor which provides a $\Delta P$ factor related to airflow (volume/unit time, hereinafter CFM airflow). CFM airflow may be calculated by the following equation:

$$CMF \text{ Air Flow} = 4005 \left( \sqrt{\frac{\Delta P}{K}} \right) \times \text{Box Area} \qquad (1)$$

where: $\Delta P$ is the $\Delta P$ factor from air flow sensor 52;

Box Area is the inlet supply cross-section area in square feet; and

K is a CFM multiplier representing the pickup gain of the air flow.

The value K and value of box area are stored in a memory (not shown) in controller 20 when controller 20 is initialized or coupled with VAV box 38. The value of box area is generally in the range of 0.08 to 3.142 feet squared, and the value of K is generally between 0.58 and 13.08. The value of box area and K may be advantageously communicated from controller 20 to work station 12 so that service people do not have to otherwise obtain these values from paper data sheets and files. Air flow sensor 56 is preferably a diaphragm-based pressure sensor.

With reference to FIGS. 1 and 2, the operation of network 10 is described as follows. Controllers 20 and 24 are configured to appropriately position actuator 72 in accordance with a cyclically executed control algorithm. In accordance with the algorithm, controller 20 receives the air flow value at input 56, the temperature value at input 54, and other data (if any) from bus 32 at port 34 every cycle, preferably every 1.5 seconds. Controller 20 provides the actuator output signal at the actuator output 74 every cycle to accurately position damper 68 so that environment 66 is appropriately controlled (heated, cooled, or otherwise conditioned). Thus, controller 20 cyclically responds to the air flow value and the temperature value and cyclically provides the actuator output signal to appropriately control internal environment 66.

Preferably, the actuator output signals are pulse width signals which cause actuator 72 to move forward, backward, or stay in the same position, and controller 20 internally keeps track of the position of actuator 72 as it is moved. Alternatively, actuator 72 may provide feedback indicative of its position, or the actuator signal may indicate the particular position to which actuator 72 should be moved.

Figure 3:
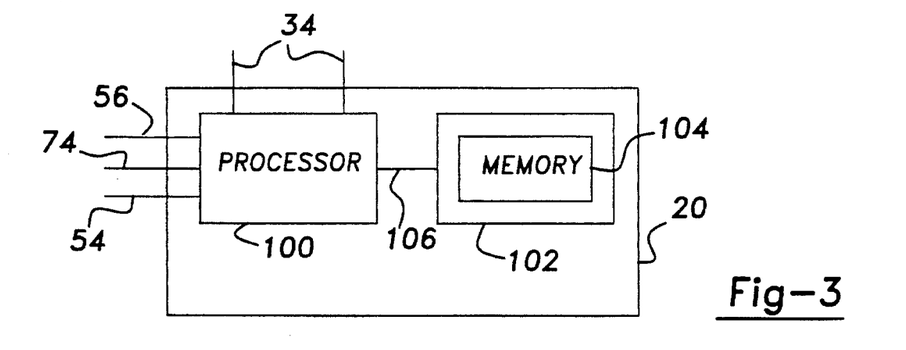
FIG. 3 is a more detailed schematic block diagram of the controller illustrated in FIG. 2.

FIG. 3 is a more detailed block diagram of controller 20 in accordance with an exemplary aspect of the present invention. Controller 20 includes a processor 100 coupled with actuator output 74, temperature input 54, air flow input 56, and communication port 34. Processor 100 is preferably an 80C652 processor and communication port 34 is coupled with a twisted pair of conductors comprising communication bus 32 (FIG. 1).

Controller 20 also includes a memory 102. Memory 102 may be any storage device including but not limited to a disc drive (hard or floppy), a RAM, EPROM, EEPROM, flash memory, static RAM, or any other device for storing information. Preferably, memory 102 includes RAM for storing diagnostic information or summary data in locations 104 and an EEPROM for storing instructions and the PI algorithm. Memory 102 is coupled to the processor via an internal bus 106.

In operation, processor 100 cyclically samples signals at temperature input 56, actuator output 74, and air flow input 56 and performs mathematical operations on these signals. The mathematical operations generate parameter values representative of the signals at inputs 54 and 56 and output 74. Preferably, controller 20 calculates average data indicative of the sampled parameter values, summary data, or diagnostic information, periodically (e.g. every 1.5 seconds) during the lifetime operation of controller 20; the summary data is periodically stored in locations 104 of memory 102.

The summary data includes controller run time data indicative of the amount of time controller 20 is turned ON, actuator duty cycle data related to the amount of time actuator 72 is moved, average temperature error data indicative of the difference between the set temperature and the actual temperature in internal environment 66, and average air flow data indicative of the difference between the CFM air flow setpoint and the actual CFM air flow. The summary data is advantageously stored in locations 104 of memory 102 every cycle as running average values. Preferably, the summary data is a small amount of cumulative data and is written over itself each cycle so that a minimum amount of memory 102 is used to store the summary data.

Processor 100 transmits the contents of locations 104 across bus 32 in response to receiving a Retrieve Controller Diagnostics (RCD) command from work station 12 at communication port 34. Alternatively, processor 100 can include a clock or timer which induces processor 100 to communicate data in locations 104 across bus 32 periodically. The summary data is provided from memory 102 to work station 12 via buses 32 and 18. The summary data in controller 20 is preferably reset to zero after receiving the RCD command. Work station 12 can be configured to store the summary data referenced to the time of the RCD command and display the summary data in a spreadsheet form.

The calculation of summary data by processor 100 in controller 20 is discussed with reference to FIGS. 4–8 below.

Figure 4:
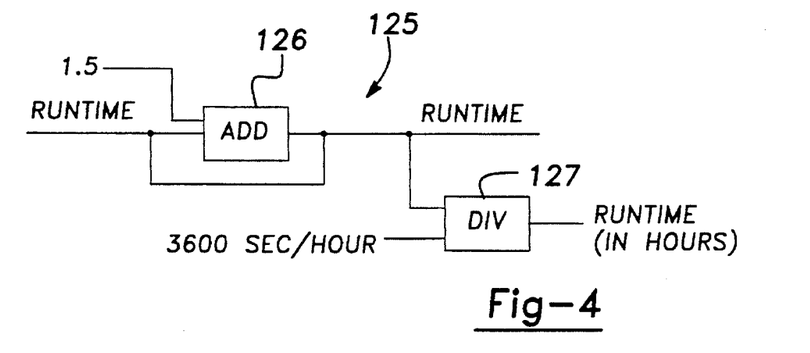
FIG. 4 is a block diagram illustrating the calculation of controller run time data for the controller shown in FIG. 3.

With reference to FIG. 4, controller 20 is programmed to operate as a run time circuit 125 which generates run time data. Circuit 125 cyclically (every 1.5 seconds) calculates the run time as part of the control algorithm. Circuit 125 includes an adder 126 which reads the run time data stored in locations 104 of memory 102, adds 1.5 to the run time data, and stores the sum in locations 104 of memory 102 as the new run time data every cycle of the control algorithm (every 1.5 seconds). Circuit 125 therefore accurately accumulates the run time data or ON time of controller 20.

Preferably, a divider 127 in circuit 125 also divides the run time data by 3,600 seconds per hour to define the run time data hours. The run time data in hours is also stored in locations 104 of memory 102. The run time data advantageously allows the operator of workstation 12 to review the length of time since the last time the summary data (diagnostic information) was extracted by workstation 12 and ascertain whether controller 20 has been accidently turned OFF since the last extraction.

Figure 5:
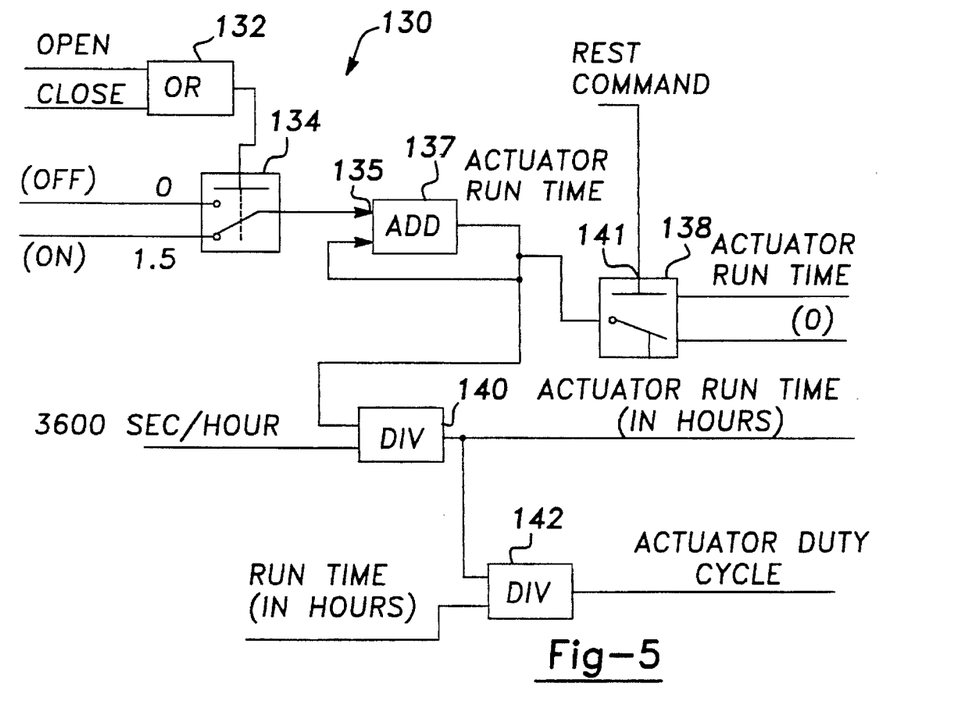
FIG. 5 is a block diagram illustrating the calculation of actuator duty cycle data for the controller shown in FIG. 3.

With reference to FIG. 5, controller 20 is programmed as a duty cycle circuit 130 which generates duty cycle data associated with the operation of actuator 72. The duty cycle is the amount of time that actuator 72 is moving (opening or closing damper 68) divided by the controller run time. Sense circuit 132 of circuit 130 determines if the control algorithm is instructing actuator 72 to open or close. Alternatively, processor 100 can determine whether actuator 72 is being opened or closed by directly sampling the actuator control signal at actuator output 74.

If actuator 72 is being moved, an adder 137 in circuit 130 reads actuator run time data stored in locations 104, adds the value 1.5, and stores the sum as the actuator run time data in locations 104. If actuator 72 is not being moved, adder 137 reads the actuator run time, adds the value 0, and stores the actuator run time data in locations 104 and 137. The value 1.5 or 0 is provided to an input 135 is provided by a circuit 134. Circuit 134 is controlled by sense circuit 132 and provides the value 1.5 when actuator 72 is being moved. Similar to circuit 125, circuit 130 updates the duty cycle data every 1.5 seconds so that the actuator run time data is accurately accumulated.

Circuit 130 also includes a reset circuit 138 which has a reset input 141. Reset circuit 138 sets the actuator run time data to zero in response to a RESET command at input 141.

A divider 140 divides the actuator run time data by 3,600 seconds per hour to obtain actuator run time data in hours and stores it in locations 104 of memory 102. Divider 142 divides the actuator run time data in hours by the controller run time in hours to obtain duty cycle data. The duty cycle data is stored in locations 104 of memory 102. The duty cycle data provides HVAC system designers significant information about maximizing the life of actuator 72.

The duty cycle data can be utilized to analyze the effectiveness of the PI algorithm. For example, a large duty cycle (over 5%) may indicate that actuator 72 is overhunting thereby causing excessive wear and premature failure of actuator 72. Preferably, actuator 72 has a duty cycle of less than 5% over a 24 hour period. A high duty cycle may also indicate that VAV box 38 is improperly sized or that thee ductwork associated with VAV box 38 is faulty.

Figure 6:
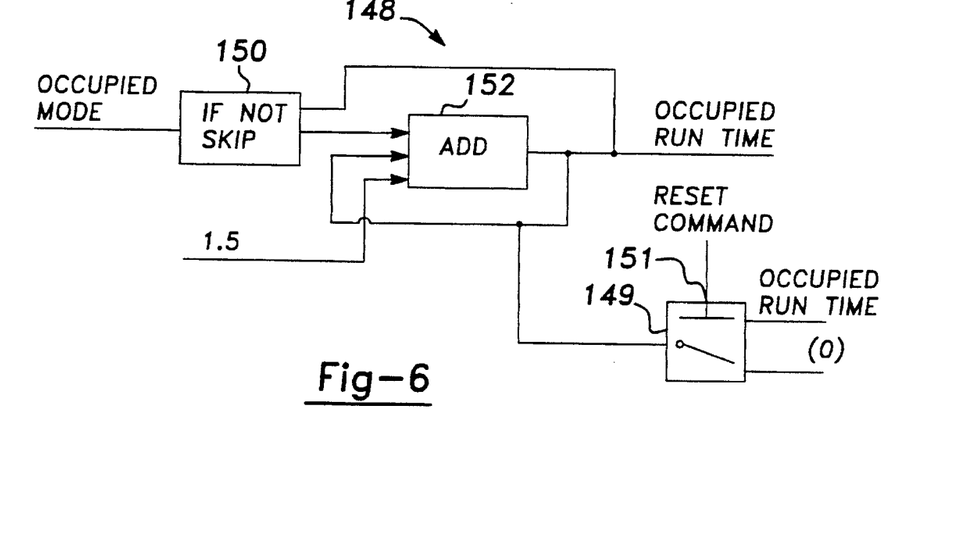
FIG. 6 is a block diagram illustrating the calculation of occupied run time data for the controller shown in FIG. 3.

With reference to FIG. 6, the calculation of temperature error data and CFM error data requires the calculation of occupied run time. Occupied run time is the amount of time that internal environment 66 associated with controller 20 is occupied. Controller 20 can include an "unoccupied" mode and an "occupied" mode. In the unoccupied mode, control of temperature and air flow in internal environment 66 is relaxed. Relaxing the control of internal environment 66 saves energy as unoccupied rooms and hallways are not heated, cooled or otherwise controlled. Therefore, the summary data is not altered if the controller 20 is in an unoccupied mode as explained with reference to FIGS. 6–8.

With reference to FIG. 6, controller 20 is programmed to operate as an occupied run time circuit 148 which generates occupied run time data. A sense circuit 150 determines if controller 20 is in an occupied mode. If controller 20 is in an occupied mode, an adder 152 reads the occupied run time data in locations 104, adds the value 1.5 to the occupied run time data and stores the sum in locations 104 of memory 102. If sense circuit 150 determines that controller 20 is in an unoccupied mode, the addition by adder 152 is skipped. Sense circuit 150 determines whether controller 20 is in the occupied mode every cycle of the PI algorithm so that an accurate accumulation of the occupied run time data is stored in locations 104 of memory 102.

Circuit 148 also includes a reset circuit 149 which has a reset input 151. Reset circuit 148 sets the occupied run time to zero in response to a RESET command at input 151.

Figure 7:
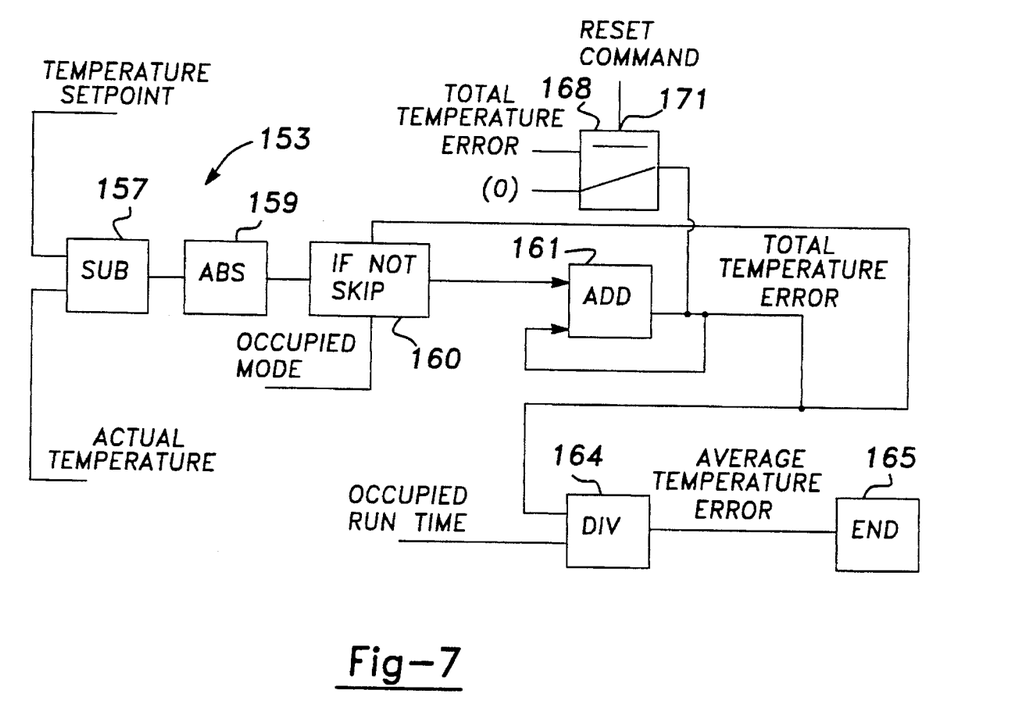
FIG. 7 is a block diagram illustrating the calculation of temperature error data for the controller shown in FIG. 3.

With reference to FIG. 7, controller 20 is programmed to operate as circuit 153 which generates average temperature error data. Subtractor 157 subtracts the actual temperature value from the setpoint temperature value. The actual temperature value is generated from the temperature signal provided at temperature control input 54. The setpoint temperature value may be programmed in the PI algorithm or otherwise set by the occupant or service person.

An absolute value circuit 159 takes the absolute value of the difference between the actual temperature value and the setpoint value. Next, a circuit 160 determines if controller 20 is in the occupied mode. If controller 20 is in the occupied mode, an adder 161 reads a total temperature error data stored in locations 104 of memory 102, adds the absolute value of the difference between the setpoint and actual temperature value and the total temperature error value, and stores the sum in locations 104 as the total temperature error data. Next, a divider 164 reads the total temperature error data from locations 104, divides the total temperature difference data by the occupied run time data, and stores the quotient in locations 104 as the average temperature error data (block 164). If controller 20 is not in the occupied mode, circuit 160 skips the addition by adder 161.

Preferably, the average temperature error data for controller 20 is below 0.5° F. Ninety-five percent of all controllers such as controller 20 in network 10 should have an average temperature error data value below 0.5° F. if network 10 is operating properly. Average temperature error data above 0.5° F. indicates errors associated with the tuning parameters of the PI algorithm, ductwork, temperature sensor 50, or other errors in network 10.

Circuit 153 also includes a reset circuit 168 which has a reset input 171. Reset circuit 153 sets the Total temperature error data to zero in response to a reset command at input 171.

Figure 8:
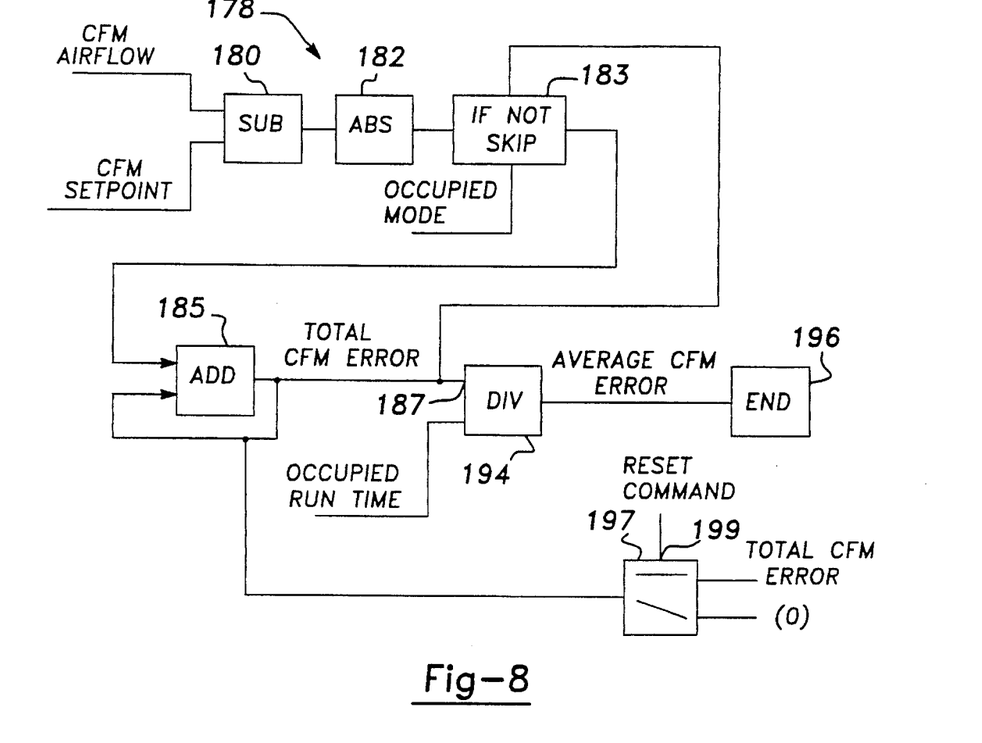
FIG. 8 is a block diagram illustrating the calculation of CFM error data for the controller shown in FIG. 3.

With reference to FIG. 8, controller 20 is programmed to operate as a CFM error circuit 178 which calculates average CFM error data. A subtractor 180 receives the CFM airflow value at air flow input 56. The CFM supply setpoint is provided by the PI algorithm. Subtractor 180 subtracts the actual CFM airflow value from the CFM supply setpoint. Absolute value circuit 182 calculates the absolute value of the difference of the actual CFM airflow value and the CFM airflow supply setpoint.

A circuit 183 determines if controller 20 is in an occupied mode. If controller 20 is in an occupied mode, adder 185 calculates total CFM error by reading total CFM error data from locations 104 and adding the absolute value of the difference between the actual CFM airflow value and the CFM airflow setpoint to the total CFM error data. Divider 194 divides the sum by the occupied run time to determine the average CFM airflow error data. If controller 20 is not in an occupied mode, processor 100 skips addition and division operations by adder 185 and divider 197. Large CFM errors may be indicative of an error in sensor 52 tuning parameters of the PI algorithm, or fan and ductwork malfunctions.

Circuit 178 also includes a reset circuit 197 which as a reset input 119. Reset circuit 197 sets the Total CFM error data to zero in response to a Reset command at input 199.

Workstation 12 receives the summary data discussed with reference to FIGS. 4–8. Workstation 12 obtains the summary data by sending the RCD command to read the summary data in locations 104 of memory 102. Workstation 12 writes the summary data to a hard disk drive (not shown) associated with workstation 12 (FIG. 1). Workstation 12 may be configured to provide the RESET command to inputs 191, 151, 171 and when the summary data is read so that the summary data is cleared in locations 104 of memory 102 of controller 20. Workstation 12 preferably writes the summary data to the hard disk drive in a form so that workstation 12 may identify the controller 20 from which the summary data is associated.

Workstation 12 is preferably configured to display the summary data as shown in FIGS. 9, 10, 11 and 12. For example, in FIG. 9, workstation 12 displays the number of actuators 72 in network 10 having particular actuator duty cycles (percentage) in a bar graph form. Such a graph also allows the operator to easily review the operations of all controllers in network 10.

Figure 9:
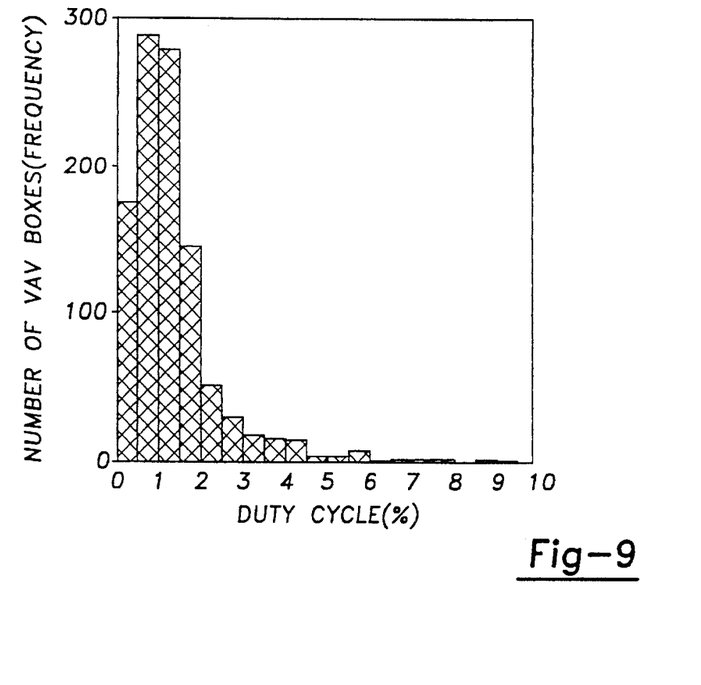
FIG. 9 is a bar graph of actuator duty cycle data calculated according to the control diagram illustrated in FIG. 5.

Work Station 12 may be configured to allow the operator to identify each VAV box associated with particular duty cycle percentages by selecting various parts of the bar graph. For example, workstation 12 may be configured to have a mouse interface (not shown) which allows the operator to "click" on to a particular bar and have the workstation list the summary data associated with the individual controllers having the selected actuator duty cycle. For instance, the operator may wish to identify all VAV boxes having an actuator duty cycle of greater than a certain percent such as 5%.

Figure 10:
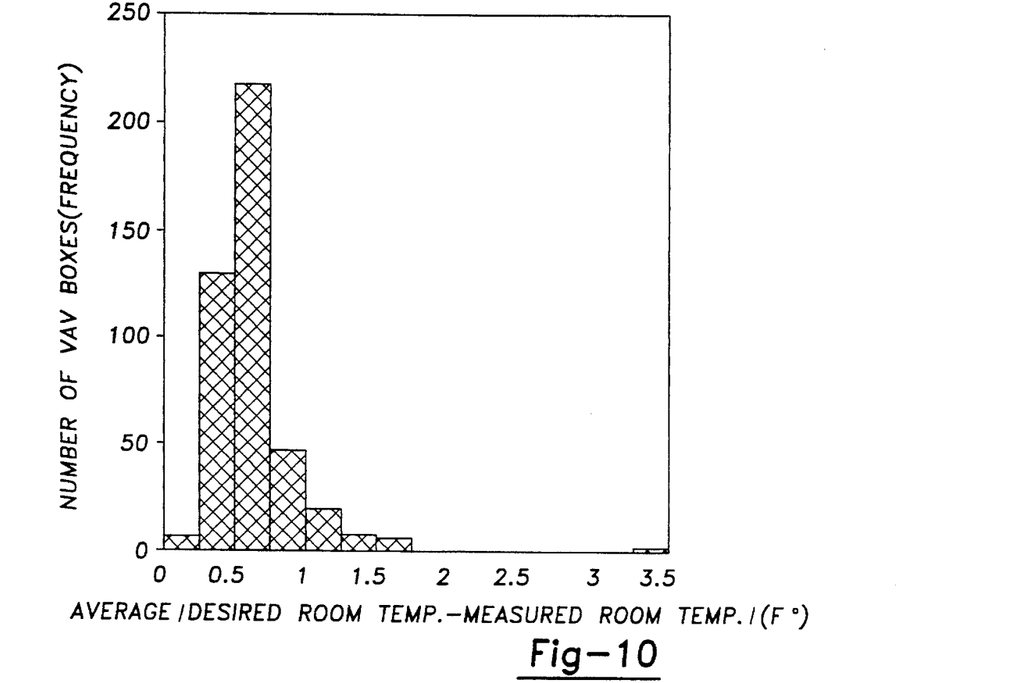
FIG. 10 is a bar graph of the temperature error data calculated according to the control diagram illustrated in FIG. 7.

With reference to FIG. 10, workstation 12 may be configured to display the number of controllers 20 in network 10 having average temperature errors in a bar graph form. The average temperature error is discussed with reference to FIG. 7. The operator may thus easily view the temperature error characteristics of entire network 10.

Further, as discussed above with reference to FIG. 9, workstation 12 may be configured to allow the operator to select various parts of the bar graph so that the summary data or diagnostic information of particular VAV boxes associated with particular temperature errors may be viewed. Once the VAV boxes are identified, the operator may adjust the PI algorithm associated with the controller or mechanically adjust the VAV box.

Figure 11:
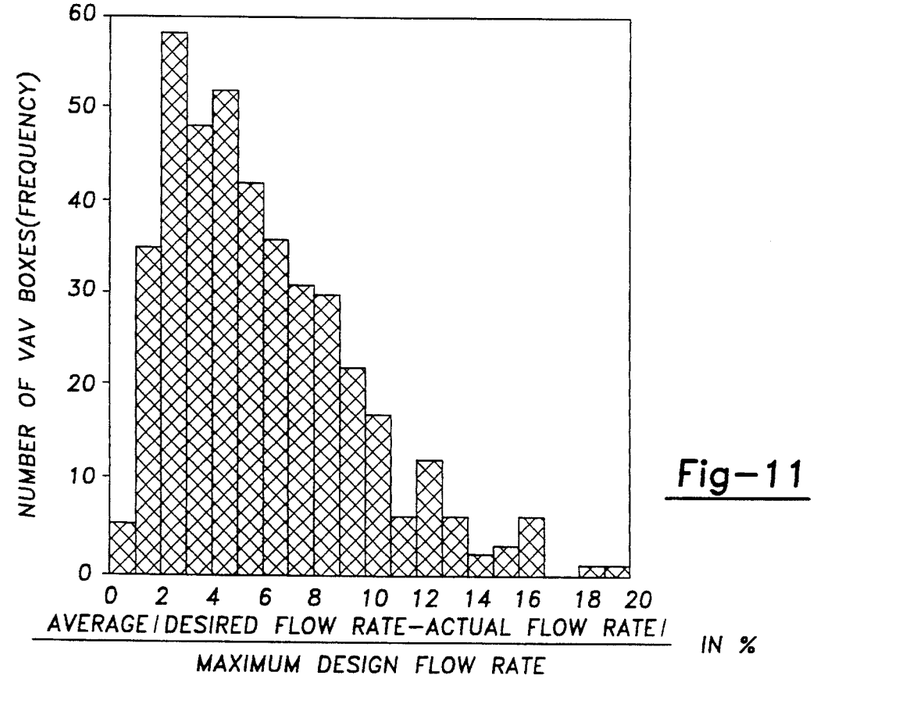
FIG. 11 is a bar graph of the CFM error data calculated according to the control diagram illustrated in FIG. 8.

With reference to FIG. 11, workstation 12 displays the number of controllers 20 in network 10 having particular average flow rate error divided by the maximum design flow rate in bar graph form. FIG. 11 allows the operator to view air flow error characteristic for entire network 10. Workstation 12 may also be configured to allow the operator to select various parts of the bar graph to identify VAV boxes in network 10 which have large air flow errors as discussed above with reference to FIG. 9.

Figure 12:
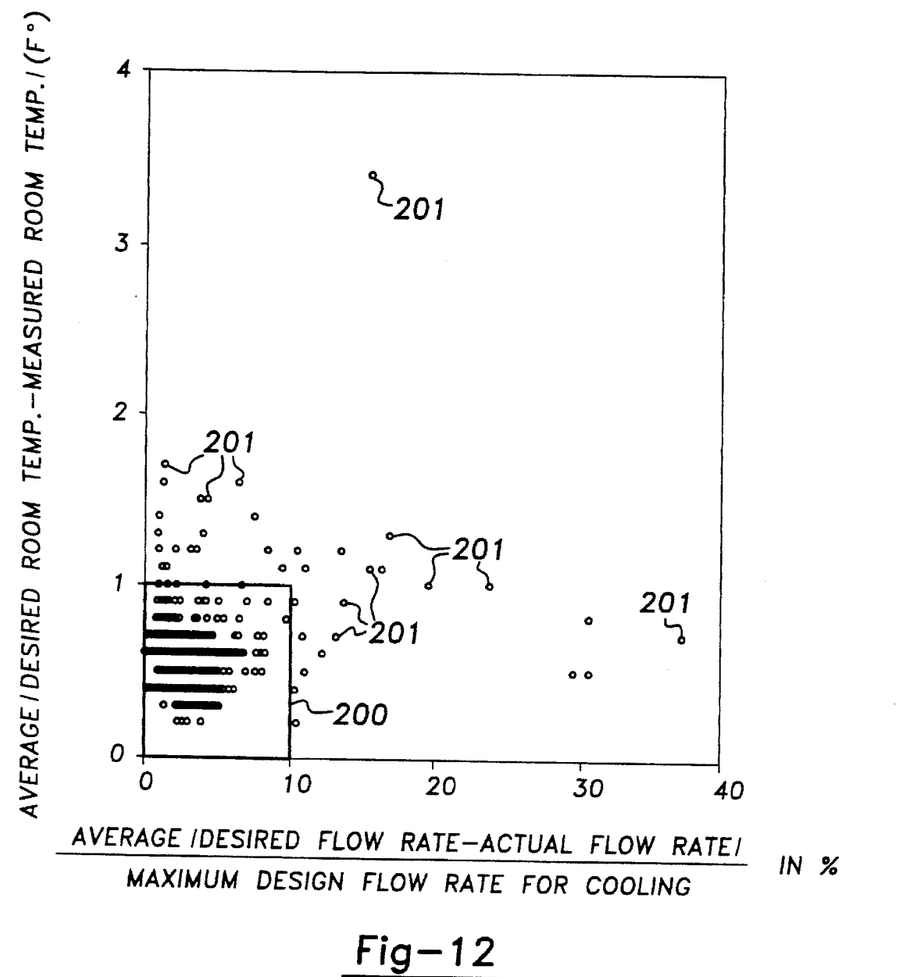
FIG. 12 is a graph of average temperature error data calculated according to the control diagram illustrated in FIG. 7 and average airflow data calculated according to the control diagram illustrated in FIG. 8.
Figure 13A:
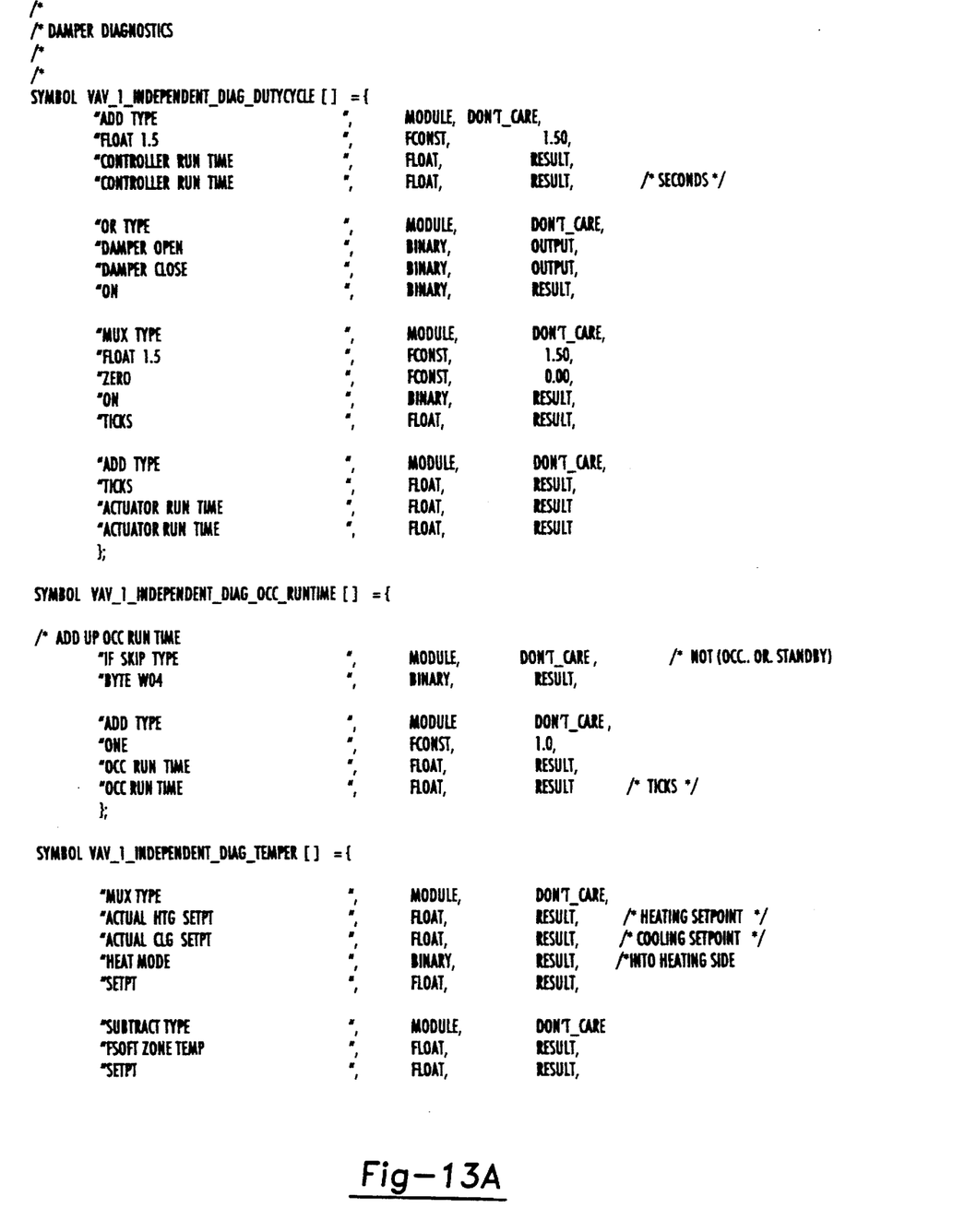
Figure 13B:
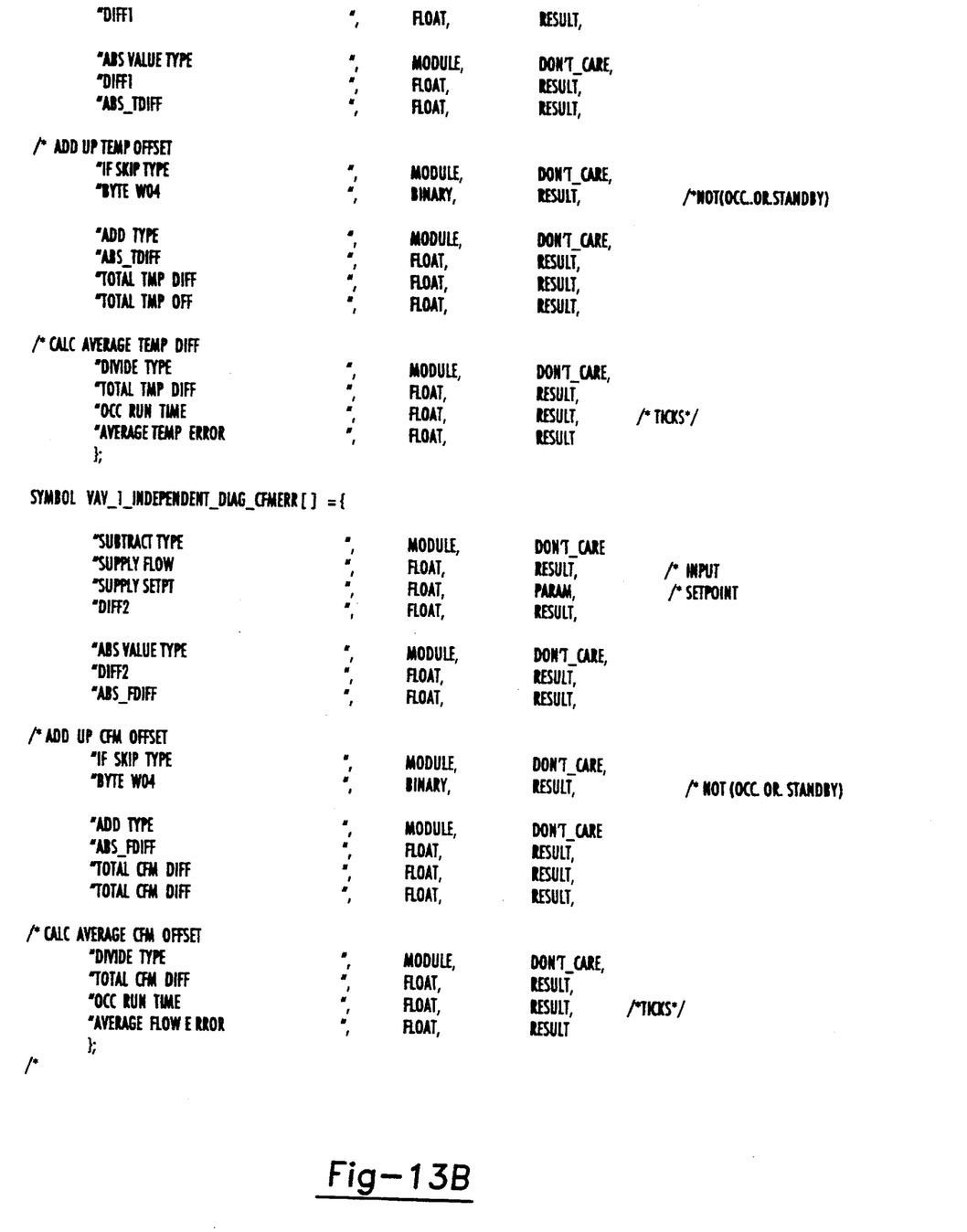

An operator may advantageously view graphs related to combinations of the summary data as shown in FIG. 12. FIG. 12 shows the error data associated with flow rate and temperature in the same graph. The VAV boxes having points within a rectangle 200 are VAV boxes which are operating properly. VAV boxes outside of rectangle 200 (outliers such as points 201) indicate VAV boxes which may need maintenance or adjustment because of their large airflow and temperature errors.

Thus, the diagnostic system discussed with reference to FIGS. 1–12 allows an operator to identify controllers 20 which are unable to control internal environment 66 within certain parameters such as a 3% duty cycle, a 1.25° F. temperature error, or a 12% CFM error. By periodically analyzing the summary data, the operator may be able to identify gradual degrading mechanical performance over the life of system 10.

Preferably, controller 20 is configured by a controller executed software. Exemplary controller executed software is provided in Appendix A and configures controller 20 for the operations discussed with reference to FIGS. 4–8. The software shows basic data collection operations and summary data calculations for system 10. Alternatively, a hardware control circuit, or other software may be utilized to collect and store data received by controller 20 and communicate the data to workstation 12.

It is understood, that while the detailed drawings and specific examples given describe a preferred exemplary embodiment of the present invention, they are for the purpose of illustration only. The invention is not limited to the precise details and conditions disclosed. For example, although particular summary duty is discussed, others diagnostic information may be calculated by processor 100 and stored in memory 102 or other memory in network 10. Also, although particular facility management systems and components are suggested, the diagnostic system may be configured for various other HVAC systems. The system may easily be configured to utilize metric units. Also, single lines in the various Figures may represent multiple conductors. Various changes may be made to the details disclosed without departing from the spirit of the invention which is defined by the following claims.

```
/* Damper Diagnostics
/*
/*
SYMBOL vav_1_independent_diag_dutycycle[ ] = (
    "ADD TYPE ", MODULE, DONT_CARE,
    "FLOAT 1.5", FCONST, 1.50,
    "Controller Run Time", FLOAT, RESULT,
    "Controller Run Time", FLOAT, RESULT, /* Seconds */
    "OR TYPE", MODULE, DONT_CARE,
    "Damper open", BINARY, OUTPUT,
    "Damper Close", BINARY, OUTPUT,
    "ON", BINARY, RESULT,
    "MUX TYPE", MODULE, DONT_CARE,
    "FLOAT 1.5", FCONST, 1.50,
    "ZERO", FCONST, 0.00,
    "ON", BINARY, RESULT,
    "TICKS", FLOAT, RESULT,
    "ADD TYPE", MODULE, DONT_CARE,
    "TICKS", FLOAT, RESULT,
    "Actuator Run Time", FLOAT, RESULT
    "Actuator Run Time", FLOAT, RESULT
    );
SYMBOL vav_1_independent_diag_occ_runtime[ ] = (
/* add up Occ Run Time
    "IF SKIP TYPE", MODULE, DONT_CARE,
    "BYTE W04", BINARY, RESULT, /* not (Occ.OR.Standby
    "ADD TYPE", MODULE, DONT_CARE,
    "ONE", FCONST, 1.0,
    "OCC RUN TIME", FLOAT, RESULT,
    "OCC RUN TIME", FLOAT, RESULT /* TICKS */
    );
SYMBOL vav_1_independent_diag_temperr[ ] = (
    "MUX TYPE", MODULE, DONT_CARE,
    "Actual Htg Setpt", FLOAT, RESULT, /* HEATING SETPOINT */
    "Actual Clg Setpt", FLOAT, RESULT, /* COOLING SETPOINT */
    "HEAT MODE", BINARY, RESULT, /* into heating side
    "SETPT", FLOAT, RESULT,
    "SUBTRACT TYPE", MODULE, DONT_CARE,
    "FSoft Zone Temp", FLOAT, RESULT,
```

```
        "SETPT", FLOAT, RESULT,
        "DIFF1", FLOAT, RESULT,
        "ABS VALUE TYPE", MODULE, DONT_CARE,
        "DIFF1", FLOAT, RESULT,
        "ABS_TDIFF", FLOAT, RESULT,
/* add up Temp Offset
        "IF SKIP TYPE", MODULE, DONT_CARE,
        "BYTE W04", BINARY, RESULT, /* not
(Occ.OR.Standby)
        "ADD TYPE", MODULE, DONT_CARE,
        "ABS_TDIFF", FLOAT, RESULT,
        "Total Tmp Diff", FLOAT, RESULT,
        "Total Tmp Diff", FLOAT, RESULT,
/* calc Average Temp Diff
        "DIVIDE TYPE", MODULE, DONT_CARE,
        "Total Tmp Diff", FLOAT, RESULT,
        "OCC RUN TIME", FLOAT, RESULT, /* TICKS */
        "Average Temp Error", FLOAT, RESULT
        );
SYMBOL vav_1_independent_diag_cfmerr[ ] = (
        "SUBTRACT TYPE", MODULE, DONT_CARE,
        "Supply Flow", FLOAT, RESULT, /* INPUT
        "Supply Setpt", FLOAT, PARAM, /* SETPOINT
        "DIFF2", FLOAT, RESULT,
        "ABS VALUE TYPE", MODULE, DONT_CARE,
        "DIFF2", FLOAT, RESULT,
        "ABS_FDIFF", FLOAT, RESULT,
/* add up CFM Offset
        "IF SKIP TYPE", MODULE, DONT_CARE,
        "BYTE W04", BINARY, RESULT, /* not
(OCC.OR.Standby)
        "ADD TYPE", MODULE, DONT_CARE,
        "ABS_FDIFF", FLOAT, RESULT,
        "Total CFM Diff", FLOAT, RESULT,
        "Total CFM Diff", FLOAT, RESULT,
/* calc Average CFM Offset
        "DIVIDE TYPE", MODULE, DONT_CARE,
        "Total CFM Diff", FLOAT, RESULT,
        "OCC RUN TIME", FLOAT, RESULT, /* TICKS */
        "Average Flow Error", FLOAT, RESULT
        );
/*
```

We claim:

1. A VAV controller operatively associated with a VAV box, said VAV controller coupled to a first communication bus, said VAV controller comprising:

parameter input means for receiving a parameter value from a sensor;

a communication port coupled with said first communication bus;

memory means for storing diagnostic information: and processor means coupled with said memory means, said parameter input means, and said communication port, for generating said diagnostic information and receiving said parameter value, and said processor means programmed to receive said parameter value at said parameter input, said processor means programmed to calculate said diagnostic information and store in said memory said diagnostic information related to an average error associated with said parameter value, said processor means programmed to provide said diagnostic information to said communication port, wherein a computer is coupled to said communication port via said first communication bus and said computer receives said diagnostic information and wherein the computer is a work station.

2. A VAV controller operatively associated with a VAV box, said VAV controller coupled to a first communication bus, said VAV controller comprising:

parameter input means for receiving a parameter value from a sensor;

a communication port coupled with said first communication bus;

memory means for storing diagnostic information; and processor means coupled with said memory means, said parameter input means, and said communication port, for generating said diagnostic information and receiving said parameter value, and said processor means programmed to receive said parameter value at said parameter input said processor means programmed to calculate said diagnostic information and store in said memory said diagnostic information related to an average error associated with said parameter value said processor means programmed to provide said diagnostic information to said communication port, wherein a computer is coupled to said communication port via said first communication bus and said computer receives said diagnostic information, and wherein said controller provides an actuator signal to said VAV box for controlling air flow, and wherein said diagnostic information further is comprised of a plurality of samples of said actuator signal.

* * * * *